US005687082A

United States Patent [19]

Rizzoni

[11] Patent Number: 5,687,082

[45] Date of Patent: Nov. 11, 1997

[54] METHODS AND APPARATUS FOR PERFORMING COMBUSTION ANALYSIS IN AN INTERNAL COMBUSTION ENGINE UTILIZING IGNITION VOLTAGE ANALYSIS

[75] Inventor: Giorgio Rizzoni, Upper Arlington, Ohio

[73] Assignee: The Ohio State University, Columbus, Ohio

[21] Appl. No.: 517,544

[22] Filed: Aug. 22, 1995

[51] Int. Cl.$^6$ ............................ G06F 19/00; F02P 17/12; G01M 15/00

[52] U.S. Cl. .............................. 364/431.08; 364/431.054; 364/431.04; 364/487; 73/117.3; 324/379

[58] Field of Search ......................... 364/431.03, 431.04, 364/431.08, 483, 487, 554, 571.01, 431.054; 123/406, 419; 395/3, 20, 21, 23; 73/117.3, 116, 118.1, 118.2, 117.1; 324/378, 379, 396, 399

[56] References Cited

U.S. PATENT DOCUMENTS

| | | | |
|---|---|---|---|
| 4,004,213 | 1/1977 | Kato et al. | 324/399 |
| 4,233,943 | 11/1980 | Rogora et al. | 123/425 |
| 4,308,519 | 12/1981 | Garcea et al. | 340/439 |
| 4,468,956 | 9/1984 | Mario | 73/117.3 |
| 4,543,936 | 10/1985 | Gardner | 123/475 |
| 4,608,855 | 9/1986 | Blauhut | 73/35.08 |
| 4,812,979 | 3/1989 | Hermann et al. | 364/431.01 |
| 4,886,029 | 12/1989 | Lill et al. | 73/117.3 |
| 4,918,389 | 4/1990 | Schleupen et al. | 123/630 |
| 5,041,976 | 8/1991 | Marko et al. | 364/424.03 |
| 5,111,790 | 5/1992 | Grandy | 123/425 |
| 5,174,267 | 12/1992 | Debiasi | 123/643 |
| 5,220,821 | 6/1993 | Moser et al. | 73/35.06 |
| 5,226,322 | 7/1993 | Armitage | 73/116 |
| 5,237,279 | 8/1993 | Shimasaki et al. | 324/391 |
| 5,271,265 | 12/1993 | Pischinger et al. | 73/35.04 |
| 5,294,888 | 3/1994 | Miyata et al. | 324/393 |
| 5,317,267 | 5/1994 | Miyata et al. | 324/402 |
| 5,327,090 | 7/1994 | Shimasaki et al. | 123/644 |

(List continued on next page.)

OTHER PUBLICATIONS

SAE Technical Paper No. 901768–"Onboard Diagnosis of Engine Misfires"; W. B. Ribbens et al.; Passenger Car Meeting & Exposition; Dearborn, Michigan; Sep. 17–20, 1990.

SAE Technical Paper No. 930461–"Spark Plug Voltage Analysis for Monitoring Combustion in an Internal Combustion Engine"; Y. Shimasaki et al.; International Congress & Exposition; Detroit, Michigan; Mar. 1–5, 1993.

SAE Technical Paper No. 930462–"Flame Ion Density Measurement Using Spark Plus Voltage Analysis"; S. Miyata et al.; International Congress & Exposition; Detroit, Michigan; Mar. 1–5, 1993.

SAE Technical Paper No. 950004–"Flame Ion Density Measurement Using Spark Plus Voltage Analysis"; J. Auzins; International Congress & Exposition; Detroit, Michigan; Feb. 27–Mar. 2, 1995.

*Primary Examiner*—Kevin J. Teska
*Assistant Examiner*—Tan Nguyen
*Attorney, Agent, or Firm*—Fay, Sharpe, Beall, Fagan, Minnich & McKee

[57] ABSTRACT

An ignition voltage analysis is performed to provide a combustion diagnosis. A first set of characteristic parameters are provided relating a plurality of spark plug voltage, current or gap impedance waveform signals to a plurality of combustion quality measures. A spark plug voltage, current or gap impedance waveform signal is sampled in real time during a first combustion process. A second set of characteristic parameters are then generated based upon the sampled first spark plug voltage waveform signal. The combustion process is classified as a one of a knocking combustion event, a normal combustion event, a slow burn event, a partial burn event, and a misfire event. The spark plug voltage, current or gap impedance waveform signals are classified according to a statistical closeness to parameters generated by a testing engine operated in each of the above operating modes. The sampled ignition voltage signals are correlated with combustion performance indices for use in practical in-vehicle implementation for feedback control, engine monitoring, or the like.

21 Claims, 5 Drawing Sheets

U.S. PATENT DOCUMENTS

| | | | |
|---|---|---|---|
| 5,347,855 | 9/1994 | Miyata et al. | 73/116 |
| 5,349,299 | 9/1994 | Kanehiro et al. | 324/399 |
| 5,349,930 | 9/1994 | Maruyama et al. | 123/143 C |
| 5,355,056 | 10/1994 | Miyata et al. | 315/209 CD |
| 5,363,046 | 11/1994 | Shimasaki et al. | 324/402 |
| 5,376,886 | 12/1994 | Shimasaki et al. | 324/402 |
| 5,383,350 | 1/1995 | Bennett et al. | 73/35.01 |
| 5,387,870 | 2/1995 | Knapp et al. | 364/431.04 |
| 5,400,760 | 3/1995 | Miyata et al. | 123/630 |

METHODS AND APPARATUS FOR PERFORMING COMBUSTION ANALYSIS IN AN INTERNAL COMBUSTION ENGINE UTILIZING IGNITION VOLTAGE ANALYSIS

BACKGROUND OF THE INVENTION

1. Field of the Invention

This invention relates to methods and apparatus for analyzing the combustion quality of an internal combustion engine and, in particular, to methods and apparatus for performing ignition and combustion analysis of an internal combustion spark ignited engine utilizing ignition voltage waveform, current, and impedance analyses.

2. Description of Related Art

In recent years, automotive exhaust emission control system performance has become an important issue across the U.S. Virtually all cars sold in the U.S. from the early 1980's have been equipped with a three-way catalytic converter in the exhaust system. In order for this catalytic converter to function correctly, the vehicle is also typically equipped with a fuel control system which maintains a stoichiometric mixture (i.e. air mass/fuel mass=14.7).

The long-term performance of automotive exhaust emission control systems is strongly influenced by the physical condition of the catalytic converter. Unfortunately, the catalytic converter is susceptible to irreversible damage from any number of factors.

In general terms, automotive engines operate in one of five broad performance categories: knocking combustion, normal combustion, slow burn, partial burn and misfire. Slow burn, partial burn and engine misfire are major causes of catalyst degradation in automotive engines. During slow and partial burn events, incomplete combustion takes place leaving behind unburned fuel and air which is pumped through the engine catalyst. Misfire is a condition in which combustion does not occur at all in one or more engine cycles in one or more cylinders due, for example, to absence of ignition, or misfueling. Under engine misfire conditions, large amounts of unburned fuel and air are pumped into the catalyst, greatly increasing its operating temperatures. Slow and partial burn conditions also increase the operating temperature but to a lesser extent. Knocking combustion is a pre-ignition burning or detonation of fuel before the normal spark timing. The condition may also lead to premature catalyst deterioration.

Increased temperatures are usually most severe under high load, high speed engine operating conditions, where even a few seconds of misfire or partial burn can cause catalyst temperatures to soar above 900° C. (1650° F.), causing irreversible damage to the catalyst. Even today's most advanced catalysts generally are unable to sustain continuous operation above 900° C. without damage. Vehicle operation while slow burn, partial burn and misfire conditions are present also contributes to excess emissions, especially when these conditions are present during engine warm-up and the catalyst has not had an opportunity to reach operating temperature. Obviously, any engine operation other than under normal combustion conditions is also undesirable because the engine produces reduced torque during slow and partial burn and very little torque, if any, during the misfiring cycle.

The integrity of the exhaust emissions system can best be maintained by monitoring its performance continuously on-board the vehicle. It is with the intent of monitoring emission system performance that the California Air Resources Board in 1989 passed regulations which will require all new vehicles after 1994 to be equipped with on-board monitoring systems capable of detecting engine combustion performance. These proposed regulations are known as OBDII and may be followed by a similar Federal EPA regulations. The proposed regulations are applicable for any abnormal combustion condition (e.g. random misfire, continuous slow burn, equally spaced misfire, etc.) for the purpose of identifying a malfunction. There are a variety of methods and systems for determining combustion normalcy. These include the use of crankshaft angular velocity fluctuation, observing the change in oxygen sensor waveform pattern, enhancing the present knock sensor concept to "listen" for the absence of combustion, installation of cylinder pressure transducers, analysis of secondary ignition waveform pattern, use of temperature sensors to detect catalyst temperature during misfire, and others.

One of the most popular methods of detecting the combustion condition of an automotive engine is the combustion pressure analysis method. This involves measuring the combustion pressure using high-cost pressure sensors disposed within the individual engine cylinders. One problem with this method is that the engine configuration must be modified a great deal in order to accommodate the placement of the pressure sensors within the cylinders. Further, the sensors are extremely costly and are sensitive to temperature and humidity to the extent that in order to achieve stable performance, a specialized water cooling system is often necessary. Lastly, installing pressure sensors changes the overall combustion chamber configuration and, therefore, there is a possibility that the combustion pressure in the engine will change.

Shimasaki, et al. propose analyzing spark plug voltage for monitoring combustion of an internal combustion engine in SAE 930461 presented at the International Congress and Exposition in Detroit, Mich. on Mar. 1–5, 1993. Shimasaki, et al. found significant differences in the waveform of the spark plug discharge voltage depending upon the combustion condition. When engine combustion is completely lacking, the required voltage during initial discharge is approximately 20% to 50% higher than normal, the duration of discharge is approximately 20–30% shorter than normal and the voltage in the latter part of the discharge is approximately 2 to 5 times higher than when the engine combustion is normal.

In another SAE publication, paper 930462, entitled "Flame Ion Density Measurement Using Spark Plug Voltage Analysis" by Miyata, et al., the ion density within the combustion chamber is used to determine the flame resistance around the spark plug gap by analyzing the waveform of the high ignition voltage of the spark plug. Miyata, et al. showed that the flame resistance characteristics change with the air to fuel ratio, intake pressure, engine speed, and ignition timing. Using this information, they demonstrated that it is possible to determine the quality of the combustion process.

In each of these references, however, no clear method is identified for performing a systematic analysis of the spark plug voltage, current or impedance to correlate the voltage measurement with combustion quality.

SUMMARY OF THE INVENTION

The present invention provides a system and plurality of methods for performing a systematic analysis of the spark plug voltage or equivalently spark current or spark plug gap impedance, to correlate sampled run-time measurements with a plurality of combustion quality measures. These measures include a knocking combustion event, a normal combustion event, a slow burn event, a partial burn event, and a misfire event.

For the purpose of ease of discussion of the invention below the terms "spark plug voltage" and "sparking plug current" will be used. However, it is to be appreciated that the invention is not limited in that regard, but also includes combustion quality analysis using "ionization voltage" and "ionization current" as well. Those skilled in the art realize that the spark plug current and voltage are equivalent to the ionization current and voltage. Also, those skilled in the art will appreciate the equivalence between the spark plug gap impedance and the channel impedance.

According to the preferred method of combustion analysis, a first set of characteristic parameters are provided relating a plurality of spark plug voltage waveform signals to a plurality of combustion quality measures. A first spark voltage waveform signal is sampled during a first combustion process. A second set of characteristic parameters are then generated based upon the sampled first spark plug voltage waveform signal. Lastly, the first combustion process is classified as a one of the above-identified combustion quality measures based upon a correlation between the first set of characteristic parameters and the second set of characteristic parameters.

According to a more limited aspect of the present invention, the classification is performed based on a statistical closeness between the first set of characteristic parameters and the second set of characteristic parameters.

According to yet another aspect of the present invention, the characteristic parameters are generated by performing a principal component analysis on the spark plug voltage waveform signals.

According to a further aspect of the present invention, the characteristic parameters are obtained by performing a wavelet transformation analysis on the spark plug voltage waveform signals.

In yet another aspect of the invention, the characteristic parameters are obtained by performing a linear parametric system identification analysis on the spark plug voltage waveform signals.

In a yet further aspect of the present invention, the characteristic parameters are obtained by performing a nonlinear parametric system identification analysis on the spark plug voltage waveform signals.

In a still further aspect of the present invention, the characteristic parameters are obtained by performing a neural network processing analysis on the spark plug voltage waveform signals.

A fuzzy classification analysis is performed in a further aspect of the present invention to obtain the characteristic parameters of the first spark plug voltage waveform signals.

It is an object of the present invention to provide an apparatus and family of methods for performing a systematic analysis of the spark plug voltage, or equivalently spark or ionization current or spark plug gap impedance, by correlating the measured indicated mean effective pressure with features of the ignition voltage waveform. It is a further object of the present invention to correlate sampled spark plug voltage with combustion performance for use in practical on- board vehicle implementation for feedback control, engine monitoring, or the like.

BRIEF DESCRIPTION OF THE DRAWINGS

The invention may take form in certain methods, parts and arrangements of parts, preferred embodiments of which will be described in detail in this specification and illustrated in the accompanying drawings which form a part hereof and wherein.

DETAILED DESCRIPTION OF THE DRAWINGS

Figure 1:
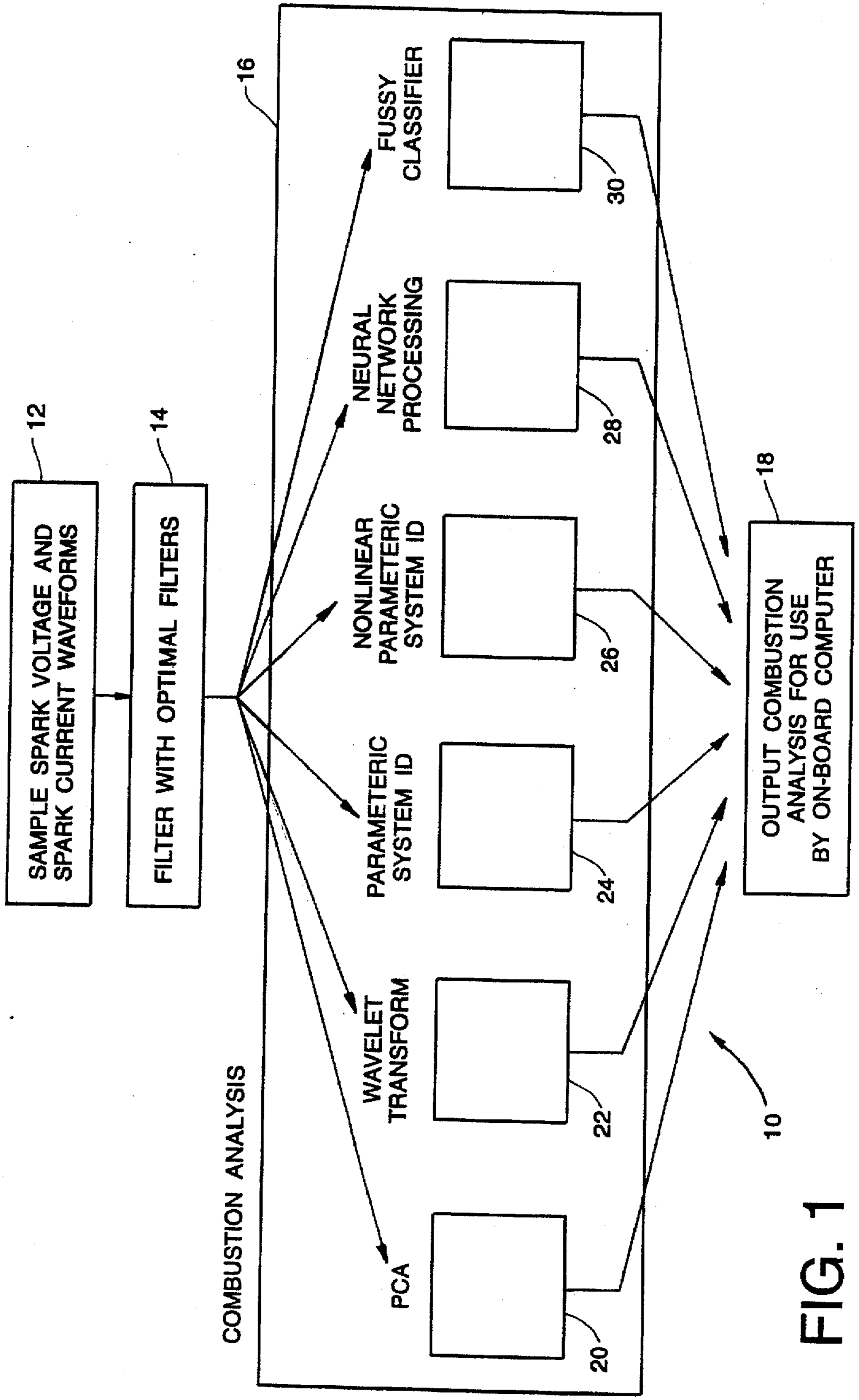
FIG. 1 is a block diagram of the preferred combustion analysis methods according to the present invention.

Referring now to the drawings wherein the showings are for the purposes of illustrating the preferred embodiments of the invention only and not for the purposes of limiting same, the FIGURES show methods and apparatus for performing combustion analysis in an internal combustion engine utilizing spark plug voltage and current analysis or, equivalently, ionization current and voltage analysis. As indicated in FIG. 1, six different but equivalent methods are provided for such detection according to the instant invention. In general, however, a family of methods will be described for performing combustion quality analysis which correlate features of the spark plug voltage with one or more combustion quality parameters alone or in combination including measured indicated mean effective cylinder pressure, burn duration, or heat release. Although the preferred methods and apparatus will be described in connection with spark plug voltage signals, it will be appreciated by those skilled in the art that ionization or spark plug current or gap impedance measurements and signals are ready substitutes for the spark plug voltage signal and provide equivalent results.

With continued reference to FIG. 1, the preferred combustion analysis method 10 according to the instant invention includes the steps of sampling a spark plug voltage waveform 12, filtering the sampled waveform 14 with one or more optimal filters, performing a combustion analysis 16 of the sampled spark plug voltage waveform and outputting 18 a combustion analysis for use by an on-board computer equipped in a vehicle. Overall, the step of performing the combustion analysis 16 is executed according to at least one of a number of equivalent methods, each of which comprising a different form of a mathematical classifier. Although the invention will be described below in terms of each of the methods being performed independently, it is also within the scope of this application to include performing two or more combinations of the methods as a form of redundant analysis.

The principal component analysis PCA method 20 maps derived principal components of the sampled waveform into an N-dimensional space derived beforehand based upon a test engine model analysis.

The wavelet transformation method 22 decomposes a plurality of spark voltage signals into orthogonal basis functions which are compared to orthogonal basis functions derived in a test engine operated under various operating conditions. For each spark waveform collected, a classification is performed in order to perform a combustion analysis thereof.

The parametric system identification analysis 24 and nonlinear parametric system identification analysis 26 generalize the internal combustion engine as a digital filter which operates according to a plurality of parameters, the parameters varying for each of the different operating modes of the engine. A plurality of parameters are stored beforehand based on a test engine operated under various combustion extremes. The parameters collected in real time on board a vehicle are compared with those previously collected and a classification of the newly collected parameters is performed to infer the combustion quality.

Both the neural network processing method 28 and fuzzy classifier method 30 generate output signals based upon a complicated set of input signals which are collected from the spark plugs voltage waveform. As with the methods briefly described above, a classification of the newly obtained parameters is performed in order to determine or otherwise assess the combustion quality.

Figure 2:
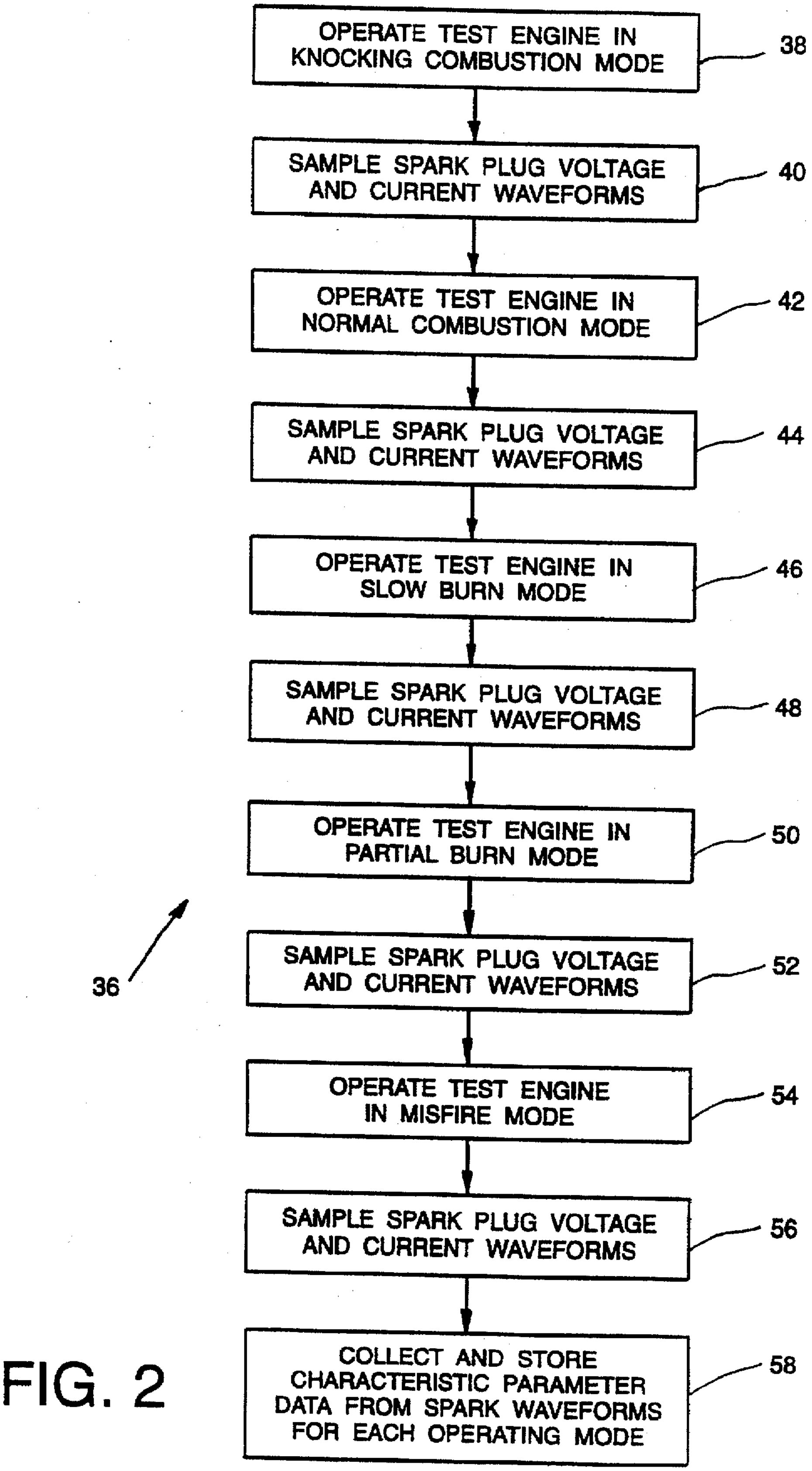
FIG. 2 is a block diagram of a preferred method of obtaining characteristic parameter values used for classification analysis in the methods of FIG. 1.

With reference now to FIG. 2, the preferred method of collecting the spark plus voltage waveform data from the test engine for storage in an onboard computer will be described. The data collected for each of the various test engine types is of course, particular to that engine type. As an example, the data collected for a large four cylinder engine will be different from that collected from a small six cylinder engine which can be expected to be different from eight cylinder engine data, etc. The method 36 of collecting the engine "signature" parameter data illustrated in FIG. 2 is therefore repeated for each engine type, preferably at the factory or at a testing facility. The data is then later transferred to an onboard computer where it is stored for use in the classification methods described below.

In the preferred embodiments of the instant invention, five internal combustion engine operatings modes are identified. They include a knocking combustion mode, a normal combustion mode, a slow burn mode, a partial burn mode, and misfire. Accordingly, the test engine is first operated in the knocking mode 38 as determined by pressure sensors or the like installed on the engine or by other well known laboratory methods. While operating in this mode, the spark plug voltage waveforms are sampled 40. The data collected at that time is filtered, processed, and analyzed in order to derive a set of characteristic parameters for use later in identifying the knocking combustion mode.

The test engine is next operated in a normal combustion mode 42. While operating in this mode, the spark plug voltage and current waveforms are sampled 44. The data collected at that time is analyzed, processed, or otherwise filtered in order to derive a set of characteristic parameters identifying a normal combustion mode.

Next, the test engine is operated in the slow burn mode 46. Spark plug voltage and current waveforms are sampled and data collected 48 in order to establish characteristic parameters of the slow burn condition in that test engine. The engine is next operated in a partial burn mode 50 and a misfire combustion mode 54 where spark plug voltage and current waveforms are sampled 52, 56 respectively, in order to obtain characteristic parameters of the partial burn and misfire modes of operation of the test engine. Lastly, at step 58, the characteristic parameter data is collected and stored in a form easily readable by a vehicle onboard computer in real time and under normal operating conditions.

Figure 3:
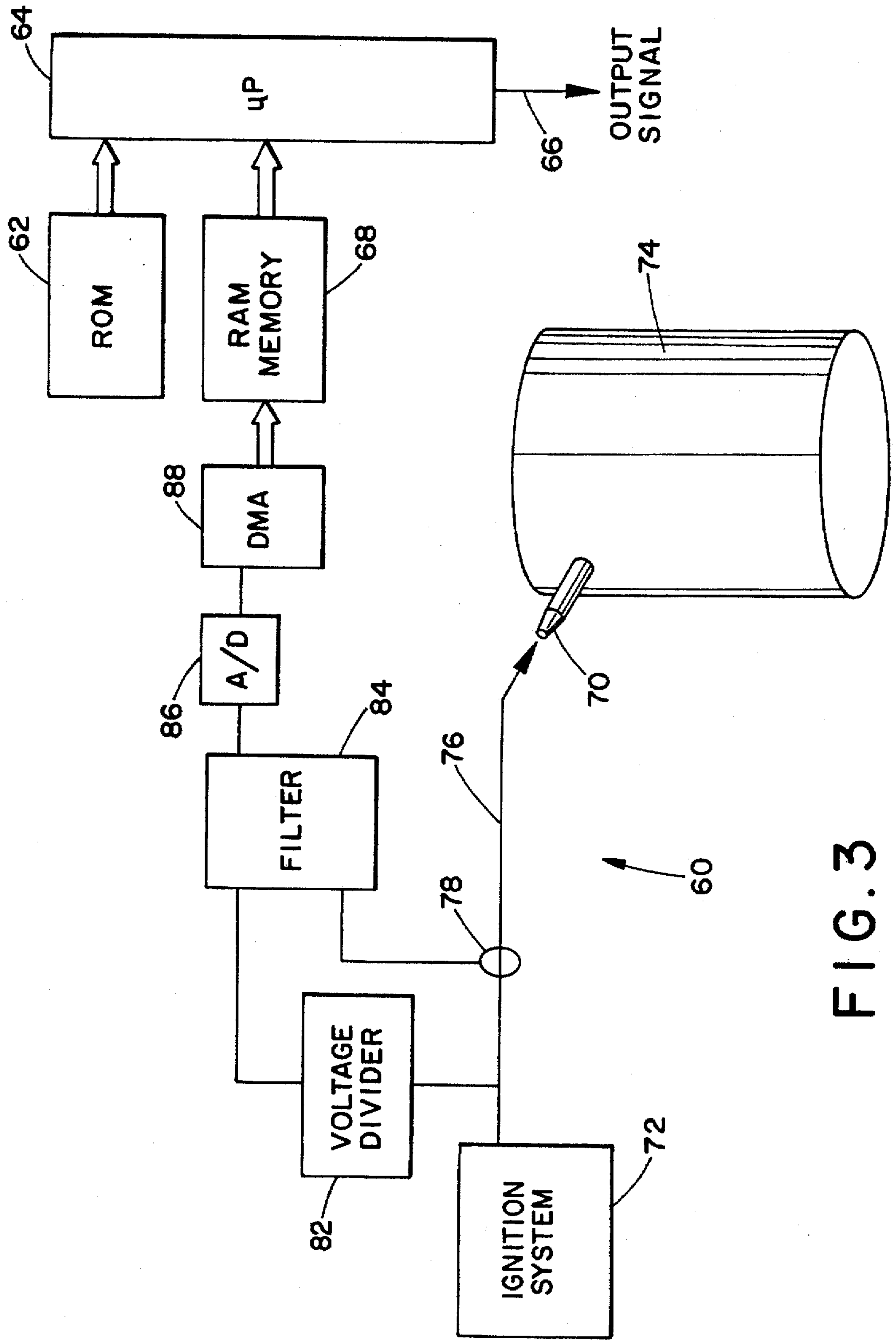
FIG. 3 is a schematic block diagram of the preferred system according to the present invention.

With reference now to FIG. 3, a preferred apparatus 60 performing combustion analysis in an internal combustion engine will be described. In the system illustrated in that FIGURE, the characteristic parameter data values derived in the method of FIG. 2 are stored in a ROM memory 62. That memory is connected to a processor 64 which performs various processing operations such as the classification schemes described below in order to generate an output signal 66 which is indicative of the combustion quality. In general, the microprocessor 64 retrieves previously stored information from the ROM 62 which includes the characteristic parameters and combines the characteristic parameter with run-time data stored in a RAM memory 68 for real time on board processing.

Overall, a spark plug 70 is connected between a vehicle ignition system 72 and a cylinder 74 by an ignition wire 76. A current probe 78 generates a voltage signal in proportion to the current flowing through the wire 76 and outputs the voltage signal to a high speed probe 80. A voltage divider 82 generates a reduced voltage signal which is proportional to the spark voltage generated by the ignition system 72. A number of optimal filters 84 are provided in order to sufficiently condition this signal for use by the apparatus 60. An analog to digital converter 86 converts the analog voltage and current signals from the filter 84 into digital values. The digital values are stored into the RAM memory 68 through a direct memory access DMA 88. Thus, for each firing of the spark plug 70 in the cylinder 74, a set of data which is the digital representation of the analog voltage is stored in the RAM memory 68. The microprocessor 64 compares this data obtained in real time with the previously stored characteristic parameters from the ROM 62. Any of the preferred methods which will be described in detail below, or combinations thereof, are used in order to generate combustion analysis signal 66. This signal may be used in a close loop control feedback system for adjusting the various air, fuel, ignition or other parameters of the vehicle in order to realized improved emissions control. Also, as indicated above, spark plug current and/or spark plug gap impedance signals may be used equivalently with the appropriate changes in transducer types.

With reference once again to FIG. 1 and with selected reference to FIGS. 4–9, the plurality of alternative preferred methods for performing the data analysis and classification methods to realize a combustion analysis according to the present invention will be described in turn.

METHOD I

PRINCIPAL COMPONENT ANALYSIS PCA

Figure 4:
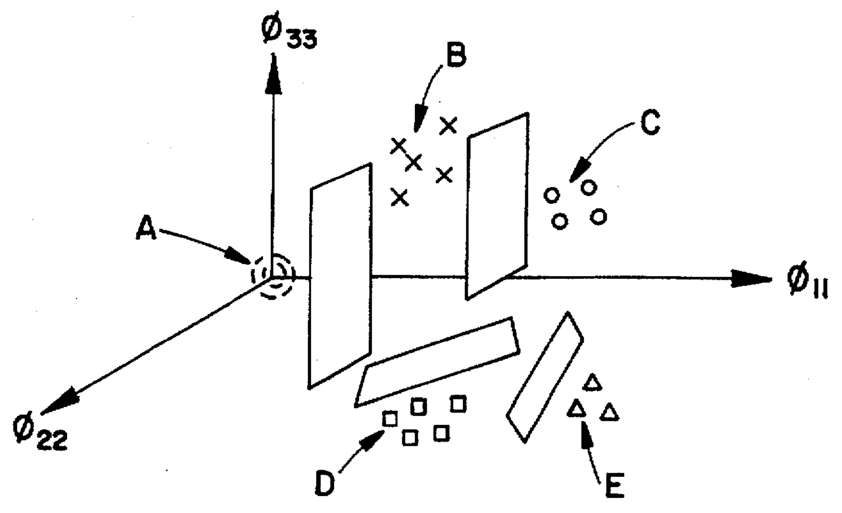
FIG. 4 is a three dimensional observation space representation of a combustion classification analysis method according to a first preferred embodiment of the instant invention.

This section describes the preferred algorithm for the classification of engine combustion based upon a mapping of a measured spark plug voltage signal onto a reduced dimension observation space. The mapping, shown schematically in FIG. 4, is defined by the principal components of a collection of original signal sets representative of all possible spark voltage waveforms. The particular transformation which is used to map the original signal into the reduced dimension observation space is called the Karhunen-Loeve Transform.

The principal component analysis PCA method of the present invention according to the instant embodiment is a very effective and efficient device for distilling the few essential features of a very large data set. Pattern classification is performed in a particularly efficient manner using the essential features extracted from the otherwise overwhelming signal set under investigation.

By way of background, the PCA method is a matrix operation which consists of computing the eigenvalues and eigenvectors of the covariance matrix for a known data set. As a rule of thumb, the covariance matrix may be estimated. In that case, if care is taken to ensure that the data used in estimating the covariance matrix is representative of all of the particular conditions to later be identified in a measured signal, the eigenvalues and eigenvectors of the estimated covariance matrix provide a nearly precise measure of the principal components of the signal set under investigation. In PCA, the M principal components of a data set are defined as the M eigenvectors corresponding to the largest M eigenvalues of the covariance matrix.

To perform a useful combustion diagnosis in an internal combustion engine, all of the basic operating conditions must be identified. According to the preferred embodiment, these operating conditions include: knocking combustion; normal combustion; slow burn; partial burn; and, misfire. Accordingly, the data comprising the signal set is obtained from the apparatus illustrated in FIG. 1 while the engine is operated in each of the above-identified four operating modes or conditions.

For each of the five operating conditions, k independent spark plug voltage observations are conducted, where each observation corresponds to one combustion event, sampled N times. Then, the covariance matrix of this data set is:

$$\Sigma = E[\underline{v}\,\underline{v}^T]$$

where E is the expectation operator and is approximated by the finite sum over k independent observations. The data collection process is repeated for the five operating modes to generate a global data set which represents the complete set of operating conditions. Preferably, k/5 samples are taken in each of the five possible operating modes. Further, as understood by those skilled in the art, the five operating modes are used to classify a continuum of engine operation. This being the case, the k/5 samples for each combustion mode are measured when the engine is operated at the "center" of each mode. Statistical closeness to these five nominal center positions is used as the classifier measure to determine combustion quality.

All of the statistics of the data set are contained in the large covariance matrix Σ. The matrix represents a correlation between individual samples and measurements. Further, all of the information regarding features or classes of the data is hidden in the large matrix.

Once the covariance matrix is obtained from the measurements taken on a test engine, the steps to classify data according to the PCA analysis of the present invention include finding the principal components of the covariance matrix using the sample data set and computing "projections" of each signal to be classified.

The principal components of the covariance matrix are obtained by first diagonalizing the matrix. One well known method of diagonalization is the singular value decomposition operation or "SVD" in MATLAB. The covariance matrix may be written as:

$$\Sigma = \Phi\ \mathrm{diag}\ (\sigma_{ii})\Phi^T$$

where the matrix Φ is the (column) matrix of eigenvectors of Σ, i.e.:

$$\Phi = [\underline{\phi}_1\ \underline{\phi}_2 \cdots \underline{\phi}_N]$$

and where the $\sigma_{ii}$'s are the eigenvalues of the covariance matrix Σ, in decreasing order of magnitude.

Typically, not all of the entries of the diagonalized covariance matrix are nonzero. Often a small number of eigenvalues represent most of the energy in the signal. For a positive definite matrix Σ, such as a covariance matrix, the energy content of the signal is equal to the trace of the matrix, which is defined as the sum of its diagonal elements, i.e.

$$tr(\Sigma) = \sum_{i=1}^{N} (\sigma_{ii})$$

where $\sigma_{ij}$ is the matrix entry in the $i^{th}$ row and $j^{th}$ column. Of course, in a diagonal matrix, the sum of the elements along the main diagonal is equal to the total energy in the signal. But when the covariance matrix Σ is diagonalized, the diagonal elements are the eigenvalues. Thus, when the largest eigenvalues are selected (and corresponding eigenvectors), i.e. those eigenvalues which sum up to 90% of the trace of Σ, the "modes" or principal components that describe the particular data set are thereby selected. This is equivalent to stating that if the original signal set is normally represented by an N-vector, and the first n eigenvalues represent about 95% of the energy in the signal, then only n coefficients are needed to represent the signal, where n is significantly smaller than N. This results in a very efficient classification method, providing that the transformations required to reduce the data set to the principal components are compatible with the computational requirements.

If the first n eigenvalues of the covariance matrix represent the signal set to a preselected level of satisfaction or accuracy, for example, greater than 90% of the trace of Σ, they may be used as an approximation of the covariance matrix. The threshold function is written as:

$$\sum_{i=1}^{n} (\sigma_{ii}) > 0.9 \sum_{i=1}^{N} (\sigma_{ii})$$

The signal set can then be considered as consisting of only n principal components, where n<N. The first few principal values are associated with the features that are most important. The "features" corresponding to $\sigma_{11}, \sigma_{22} \ldots \sigma_{nn}$ in the equation above are the first n vectors of Φ.

The spark plug voltage data sets used to illustrate the method of the preferred embodiment were divided into two subsets, each consisting of data under all five combustion operating conditions. One set, a training set, is used to find the principal components and the other, a testing set, is used to evaluate the performance of the classification. Based on the training data, the three largest eigenvalues of the covariance matrix are obtained and the three eigenvectors which correspond to these largest eigenvalues are selected to construct the truncated transform defined by $$\hat{\Phi} = [\underline{\phi}_1\ \underline{\phi}_2\ \underline{\phi}_3]$$

The truncated transform $\hat{\Phi}$ is stored in ROM or other memory within a computer on a vehicle equipped with an engine of the type used to obtain the original collection of signal sets. Thereafter, combustion analysis is performed on-the-fly by merely mapping each new signal into a point on the two dimensional subspace spanned by $\phi_1$, $\phi_2$ and $\phi_3$ (i.e. a 3-D space). The proximity of this new point to any of the five operating mode clusters is an indication of the type of combustion which took place.

FIG. 4 illustrates an example of a combustion signal set having three principal components. In that case, combustion analysis is performed on-the-fly by merely mapping each new signal into a point in the three dimensional subspace spanned by $\phi_{11}$, $\phi_{22}$ and $\phi_{33}$. The proximity of this new point to any of the five operating mode clusters is an indication of the type of combustion which took place. In that FIGURE, cluster A represents a knocking combustion event, cluster B represents a normal combustion event, cluster C represents a slow burn event, cluster D represents a partial burn, while cluster E represents a misfire in the three dimensioned subspace spanned by $\phi_{11}$, $\phi_{22}$ and $\phi_{33}$ illustrated in the FIGURE. Of course, n dimensional surfaces are used for classification. The various clusters A–D may be separated by suitable three dimensional surfaces for the purposes of classification in the example of FIG. 4.

METHOD II

Wavelet Transformation and Pattern Classification

Figure 5:
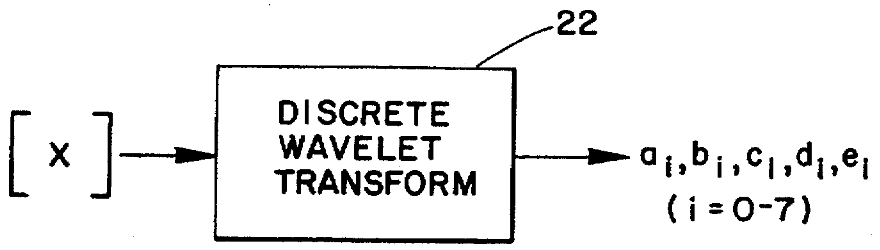
FIG. 5 is a block diagram representation of a combustion classification analysis method according to a second preferred embodiment of the instant invention.

With reference to FIG. 5, a second embodiment of the present invention will be described. In this embodiment, a wavelet transform is applied to a spark plug voltage signal in order to perform a combustion diagnosis in the engine. Wavelet analysis is a method by which a general function of time is decomposed into a series of orthogonal basis functions, called wavelets. Each of the wavelets are of different lengths and assume different positions along the time axis defined by a collection of wavelet coefficients.

In this embodiment, a plurality of spark plug voltage signals are decomposed into an orthogonal basis function, or a scaling function, through a discrete wavelet transform. The resulting wavelet coefficients are then used for pattern classification to classify each spark event into a one of the four basic combustion modes or conditions. One advantage of this embodiment is that a filter is not needed for the original data obtained from the raw spark plug signal.

The wavelet expansion of a general spark plug voltage signal f(x) can be expressed as:

$$v(n) = a_0\phi(n) + a_1W(n) + [a_2\, a_3]\begin{bmatrix} W(2n) \\ W(2n-1) \end{bmatrix} + [a_4\, a_5\, a_6\, a_7]\begin{bmatrix} W(4n) \\ W(4n-1) \\ W(4n-2) \\ W(4n-3) \end{bmatrix} + \ldots + a_{2^j+k}W(2^jn-k) + \ldots$$

where, $\phi(n)$ is the scaling function for wavelet analysis $a_o = \int v(n)\,\phi(n)\,dn$ is the first wavelet coefficient $a_{2^j+k} = 2^j\int v(n)W(2^jn-k)dn$ *are the* $2^j+k^{th}$ wavelet coefficients W(n) is the dilation wavelet which is calculated by using equation:

$$W(n) = -c_3\phi(2n) + c_2\phi(2n-1) - c_1\phi(2n-2) - c_0\phi(2n-3)$$

For the purposes of the following detailed description of the instant preferred embodiment, f(n) will be used to represent a spark plug voltage signal under knocking combustion conditions, g(n) will be used to represent a spark plug voltage signal without misfire, h(n) a signal corresponding to a slow burn combustion process, i(n) a signal corresponding to a partial burn combustion process and j(n) a signal corresponding to a misfire combustion process. Next, the signals f(n), g(n), h(n), i(n), j(n) are transformed using the above wavelet transform to find the associated wavelet coefficients.

In this preferred embodiment only the first 8 wavelet coefficients are calculated. Thus, 8 wavelet coefficients $a_i$, $b_i$, $c_i$, $d_i$ and $e_i$ (i=0 . . . 7) are generated for each f(n), g(n), h(n), i(n) and j(n) respectively according to:

$$f(n) = a_0f(n) + a_1W(n) + [a_2\, a_3]\begin{bmatrix} W(2n) \\ W(2n-1) \end{bmatrix} + [a_4\, a_5\, a_6\, a_7]\begin{bmatrix} W(4n) \\ W(4n-1) \\ W(4n-2) \\ W(4n-3) \end{bmatrix}$$

$$g(n) = b_0\phi(n) + b_1W(n) + [b_2\, b_3]\begin{bmatrix} W(2n) \\ W(2n-1) \end{bmatrix} + [b_4\, b_5\, b_6\, b_7]\begin{bmatrix} W(4n) \\ W(4n-1) \\ W(4n-2) \\ W(4n-3) \end{bmatrix}$$

$$h(n) = c_0\phi(n) + c_1W(n) + [c_2\, c_3]\begin{bmatrix} W(2n) \\ W(2n-1) \end{bmatrix} + [c_4\, c_5\, c_6\, c_7]\begin{bmatrix} W(4n) \\ W(4n-1) \\ 2(4n-2) \\ W(4n-3) \end{bmatrix}$$

$$i(n) = d_0\phi(n) + d_1W(n) + [d_2\, d_3]\begin{bmatrix} W(2n) \\ W(2n-1) \end{bmatrix} + [d_4\, d_5\, d_6\, d_7]\begin{bmatrix} W(4n) \\ W(4n-1) \\ 2(4n-2) \\ W(4n-3) \end{bmatrix}$$

$$j(n) = e_0\phi(n) + e_1W(n) + [e_2\, e_3]\begin{bmatrix} W(2n) \\ W(2n-1) \end{bmatrix} + [e_4\, e_5\, e_6\, e_7]\begin{bmatrix} W(4n) \\ W(4n-1) \\ 2(4n-2) \\ W(4n-3) \end{bmatrix}$$

Since a uniform scaling function $\phi(n)$ and dilation wavelet w(n) are implemented through the wavelet transforms, any differences in the signals f(n), g(n), h(n), i(n) and j(n) appear in wavelet coefficients $a_i$, $b_i$, $c_i$, $d_i$ and $e_i$.

Once obtained in the test engine using the generalized method shown in FIG. 2, the coefficients $a_i$, $b_i$, $c_i$, and $d_i$ are used for pattern classification. Let $\bar{a}$; $\bar{b}$; $\bar{c}$; $\bar{d}$ and $\bar{e}$ be i dimensional Euclidean vectors consisting of wavelet coefficients $a_i$, $b_i$, $c_i$, $d_i$ and $e_i$. Then the vectors are:

$\bar{a} = [a_0\ a_1\ \ldots\ a_i]^T$ $\bar{b} = [b_0\ b_1\ \ldots\ b_i]^T$ $\bar{c} = [c_0\ c_1\ \ldots\ c_i]^T$ $\bar{d} = [d_0\ d_1\ \ldots\ d_i]^T$ $\bar{e} = [e_0\ e_1\ \ldots\ e_i]^T$ The angle between two vectors and the difference in length of two vectors are easily obtained. Since $\bar{a}$, $\bar{b}$, $\bar{c}$, $\bar{d}$ and $\bar{e}$ are recognized operating modes, they are used in the preferred embodiment as reference signals to calculate the angle and the difference in length with any other test signal vectors, such as $\bar{x}$.

The wavelet coefficients $a_i$, $b_i$, $c_i$, $d_i$ and $e_i$ are stored in a memory in an automobile having an equivalent engine as the engine used in accumulating the signals f(n), g(n), h(n) i(n) and j(n). Thereafter, the spark plug voltage signal j(x) can be used to classify the combustion into one of the four operating modes using the coefficient values described above. The angle and the difference in length between vectors $\bar{a}$, $\bar{b}$, $\bar{c}$, $\bar{d}$ and $\bar{e}$ generated by wavelet transform of f(n), g(n), h(n), i(n) and j(n) and the vector $\bar{e}$ generated by the raw signal j(x) are used to classify the combustion into one of the five operating modes and therefore perform analysis thereof.

METHOD III

Parametric System Identification

The classical approach to spectral estimation uses a fast Fourier transform (FFT) operation on either windowed data or windowed autocorrelation function (ACF) estimates. The implicit assumption in windowing is that the data or ACF outside the observation window is actually zero, which is not necessarily always the case in practice. It is sometimes the case, however, that a model for the process which generates the sampled data is known. In this case it becomes possible to use a priori information to improve the estimate of the signal spectrum. In effect, classical SE's also use an underlying model, namely, that the signal is made up of a harmonic series. However, the harmonic model is inadequate to represent noise since the PSD of random noise is not well modeled by a finite harmonic series. Thus, with a large variance, there is a subsequent need for averaging several spectral estimates in the Welch SE. The aim of parametric spectral analysis is precisely to employ any available knowledge of the signal properties in order to postulate a model for the signal spectrum which can be represented by a small number of parameters. The spectral estimation problem then consists of estimating the parameters which best fit the data. According to the instant preferred embodiment of the present invention, different sets of parameters are obtained for each of the five basic engine operating modes.

Figure 6:
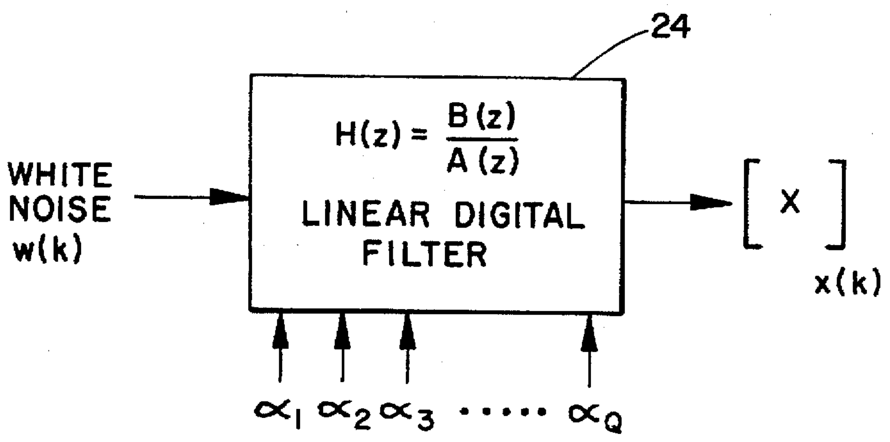
FIG. 6 is a block diagram representation of a combustion classification analysis method according to a third preferred embodiment of the instant invention.

One of the more general models in parametric spectral analysis assumes that the sampled data is the output of a dynamic system described by a rational transfer function, and excited by a fictitious white noise sequence. This is in effect equivalent to stating that the spectrum of the signal is equal to the frequency response of the dynamic system, since the spectrum of the white noise input is a constant for all frequencies. FIG. 6 illustrates the general form of a rational transfer function model.

By analogy with digital filter theory, the rational transfer function in the digital frequency domain corresponds to a linear difference equation in the discrete time domain: or $$x(k) = -\sum_{n=1}^{p} a_n x(k-n) + \sum_{n=0}^{q} b_n w(k-n)$$

$$\sum_{N=0}^{p} a_n x(k-n) = \sum_{n=0}^{q} b_n w(k-n)$$

where $$A(z) = \sum_{n=0}^{p} a_n z^{-n} = 1 + \sum_{n=1}^{p} a_n z^{-n}$$

is the Z-transform of the left hand side of the equation above and $$B(z) = \sum_{n=0}^{q} b_n z^{-n}$$

is the Z-transform of the right hand side of the equation above.

The left-hand side, A(Z), is called the autoregressive (AR) part, while the right hand side, B(Z), is referred to as the moving average (MA) part. Hence the terminology "ARMA" model is used. The similarity in the structure of the ARMA model and that of a IIR digital filter is to be noted. If it is assumed that the (fictitious) white noise PSD is equal to $\sigma^2$, then according to A(Z) and B(Z) above, the PSD of the signal x(k) is given by $$P_{xx}(f) = \sigma^2 \Delta t / \frac{B(e^{j2\pi f\Delta t})}{A(^{j2\pi f\Delta t})} /^2$$

where $B(e^{j2\pi f\Delta t})$ and $A(^{j2\pi f\Delta t})$ are equal to B(z) and A(z) evaluated around the unit circle, and $\Delta t$ is the sampling interval.

To demonstrate how such a model is advantageously used to compactly represent the spectrum of a signal, an example single sinusoid will be considered. This particular signal could be modeled by the above equation by simply selecting the parameters to be those of an underdamped second order system with a natural frequency equal to the frequency of the sinusoid and damping ratio suitable to represent the amplitude of the sinusoid.

The simpler form of the AR model becomes:

$$x(k) = -\sum_{n=1}^{p} a_n(x(k-n) + w(k-n))$$

This model is particularly well suited to modeling the spark voltage signal. The general form of the AR spectrum is characterized by an all-pole transfer function:

$$P_{xx}(f) = \left/ \frac{\sigma^2 \Delta t}{A(e^{j2\pi f\Delta t})} \right/^2$$

which can also be written using the equation for A(Z) as:

$$P_{xx}(f) = \frac{\sigma^2 \Delta t}{\left/ 1 + \sum_{n=1}^{p} a_n e^{-j2\pi f\Delta t} \right/^2}$$

It is to be noted, that the PSD of x(k) depends on the p $a_n$ parameters, plus the fictitious noise PSD, $\sigma^2$. Thus, in all, p+1 parameters need to be estimated.

The AR model can easily represent "peaky" power spectra, since each peak can be represented by a pair of complex poles. To demonstrate the efficiency of this approach with respect to the classical methods, suppose that an N-point data sequence is used to estimate the PSD of the voltage signal. This results in the estimation of N/2 frequency components. If, however, the voltage signal model of interest is represented by s spectral peaks, the number of parameters to be estimated in the AR approach is 2s+1. In practice, s might be anywhere between 1 and 5. It is, therefore, apparent that for an even moderately large N, a significant reduction in the number of parameters is obtained by employing the parametric approach.

With reference now to FIG. 6, a third embodiment of the present invention will be described. In this embodiment, the spark plug voltage signal itself is thought of or modeled as the output of a linear digital filter operating according to a set of coefficients $\alpha_1, \alpha_2, \ldots \alpha_Q$, to generate a set of spark plug voltage waveform outputs X from a white noise input. The thrust of this embodiment is to identify the set of coefficients $\alpha_1, \alpha_2, \ldots \alpha_Q$, of the digital filter that make the mapping of white noise to the waveform outputs X, correct. This is equivalent to estimating the spectrum of the signal.

In the knocking combustion mode a first set of spark plug voltage waveform outputs $X_1$ are produced by the test engine and are sampled by the apparatus of FIG. 3. The matrix $[X_1]$ is used to identify a first set of coefficients $\alpha_1, \alpha_2, \ldots \alpha_Q$, of the "digital filter" which map the white noise into the matrix $[X_1]$. Similarly, second, third, fourth and fifth sets of coefficients $b_1$–$b_Q$, $c_1$–$C_Q$ and $d_1$–$d_Q$ and $e_1$–$e_Q$ are identified in the normal combustion, slow burn, partial burn and misfire conditions to perform a mapping of the white noise onto corresponding spark plug voltage waveform output matrices $[X_2]$, $[X_3]$, $[X_4]$ and $[X_5]$. The sets of coefficients are stored in a memory on board a vehicle for run-time comparison with coefficients $f_1$–$f_Q$ from spark plug voltage waveforms obtained during vehicle operation. A combustion analysis is performed based on a classification of these coefficients $f_1$–$f_Q$, with coefficients $a_i$, $b_i$, $c_i$, $d_i$ and $e_i$. The run-time analysis is shown generally in FIG. 1. A formal development of the instant preferred embodiment follows below.

Once obtained in the test engine, the coefficients $a_i$, $b_i$, $c_i$, $d_i$ and $e_i$ are used for pattern classification. Let $\bar{a}$, $\bar{b}$, $\bar{c}$, $\bar{d}$ and $\bar{e}$ be i dimensional Euclidean vectors comprising wavelet coefficients $a_i$, $b_i$, $c_i$ and $d_i$, then we have $$\bar{a}=[a_0\ a_1 \ldots a_i]^T$$
$$\bar{b}=[b_0\ b_1 \ldots b_i]^T$$
$$\bar{c}=[c_0\ c_1 \ldots c_i]^T$$
$$\bar{d}=[d_0\ d_1 \ldots d_i]^T$$
$$\bar{e}=[e_0\ e_1 \ldots e_i]^T$$

The angle between two vectors and the difference in length of two vectors are easily obtained. Since $\bar{a}$, $\bar{b}$, $\bar{c}$, $\bar{d}$ and $\bar{e}$ represent the recognized operating modes, they are used as reference signals to calculate the angle and the difference in length with any other test signal vectors, such as $\bar{f}$ obtained in real time while the engine is operating in a vehicle.

Therefore the run-time spark voltage signal f(x) can be classified using the values above mentioned. The angle and the difference in length between vectors $\bar{a}$, $\bar{b}$, $\bar{c}$, $\bar{d}$ and $\bar{e}$ generated by the wavelet transforms of a(x), b(x), c(x), d(x) and e(x) and the vector $\bar{f}$ generated by the raw signal j(x).

The algorithms which are required to estimate a model of the background noise can be implemented on-line recursively or in block form. On-line implementation naturally leads to a very simple detection strategy.

In the preferred embodiment, the estimated AR model parameters for the spark plug voltage windowed vibration data are continuously estimated and compared to a pre-computed model of the knocking combustion, the normal combustion, slow burn and partial burn signals. The degree of statistical closeness to the parameters of each of these models is used to classify the spark plug voltage signal for combustion analysis.

Adaptive detection strategies using parametric models are a natural evolution and contemplated here, since those models can be estimated and updated on-line as well.

METHOD IV

Non-Linear Parametric System Identification

Figure 7:
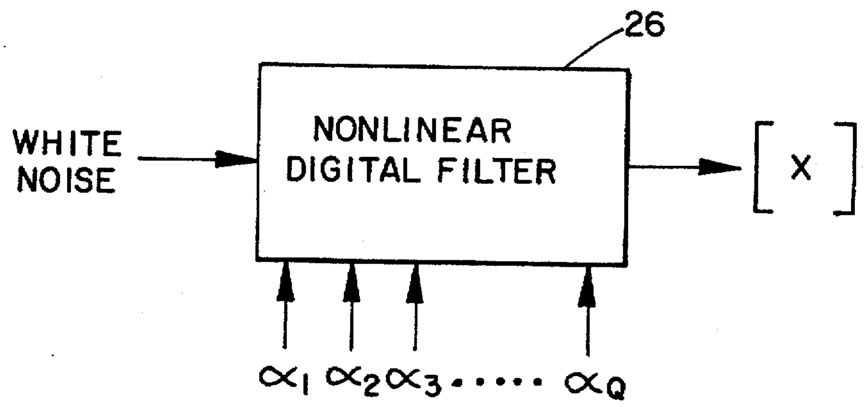
FIG. 7 is a block diagram representation of a combustion classification analysis method according to a fourth preferred embodiment of the instant invention.

With reference now to FIG. 7 a fourth embodiment of the present invention will be described. In this embodiment, the spark plug voltage signal is analogized to the output of a non-linear digital filter which is parameterized by means of a set of basis functions. The internal combustion engine modeled as a filter generates a set of spark plug voltage waveform outputs X from a white noise input. The thrust of this embodiment is to identify the set of parameters of $\alpha_1, \alpha_2, \ldots \alpha_Q$ of the non-linear digital filter that make the mapping of white noise input to the waveform outputs X correct.

In the knocking combustion mode a first set of spark plug voltage waveform outputs $X_1$ are produced by the test engine and are sampled by the apparatus of FIG. 3. The known matrix $[X_1]$ of output signals is used to identify a first set of parameters $\alpha_1, \alpha_2, \ldots \alpha_Q$ of the "non-linear digital filter" (engine) which map the white noise fictitious input signal into the matrix $[X_1]$. Similarly, second, third, fourth and fifth sets of parameters $\beta_1$–$\beta_Q$, $\gamma_1$–$\gamma_Q$, $\sigma_1$–$\sigma_Q$ and $\epsilon_1$–$\epsilon_Q$ are identified in the normal combustion, slow burn, partial burn and misfire conditions to perform a mapping of the white noise onto corresponding spark voltage waveform output matrices in normal combustion $[X_2]$, slow burn $[X_3]$, partial burn $[X_4]$ and misfire $[X_5]$ conditions.

The sets of parameters are stored in a memory device on board a vehicle for comparison with parameters $\zeta_1$–$\zeta_Q$ from spark plug voltage waveforms obtain in real time during vehicle operation. A combustion analysis is performed based on a classification of these parameters $\zeta_1$–$\zeta_Q$ with parameters $\alpha_1$–$\alpha_Q$, $\beta_1$–$\beta_Q$, $\gamma_1$–$\gamma_Q$ and $\sigma_1$–$\sigma_Q$ and $\gamma_1$–$\gamma_Q$. A formal development of the instant embodiment follows below.

The NARMAX technique is capable of approximating the nonlinear function that governs the dynamics of a system, and is thus a preferred method of modeling the dynamics of an internal combustion engine. The NARMAX methodology and its use according to this embodiment of the present invention, will be described in detail below.

According to the NARMAX model structure a discrete time non-linear system can be represented as follows:

$$Y(t)=f(y(t-1), \ldots, y(t-n_y), u(t-1), \ldots, u(t-n_u))$$

$$\text{where } y(t)=\begin{bmatrix} y_1(t) \\ y_2(t) \\ \cdot \\ \cdot \\ \cdot \\ y_m(t) \end{bmatrix}, u(t)=\begin{bmatrix} u_1(t) \\ u_2(t) \\ \cdot \\ \cdot \\ \cdot \\ u_r(t) \end{bmatrix}$$

The y(t) is the vector of system outputs, and u(t) is the vector of the system inputs, respectively. This representation is quite general since the function f(.) can take any form, and $n_y$ and $n_u$ can each take arbitrary values.

In general, the non-linear form of f(.) is unknown. The parameters are used to classify the combustion based on spark voltage waveform. A polynomial expansion of f(.) is a convenient choice for parameterization. However, it is not the only choice. The arguments of f(.) appearing in the equation above may be denoted by the following vector:

$$P=[y(k-1) \ldots y(k-n_y)\ u(k) \ldots u(k-n_u)]$$

When $P_i$ is used to denote the ith element of the vector, then the NARMAX model of the system may be approximated by the polynomial form:

$$y(t)=\sum_{i=1}^{N_y+N_{u+1}}\theta_i P_i+\sum_{i=1}^{N_y+N_{u+1}}\sum_{j=1}^{N_y+N_{u+1}}\theta_{ij}P_iP_j$$

For MIMO systems, a number of possible model structures are defined that give rise to different diagnostic algorithms. Two different model structures—denoted type I and type II below, are described and discussed here.

The type I model equation is preferably represented as follows:

$$\hat{y}_i(t)=f(\hat{y}_i(t-1),\ldots,\hat{y}_i(t-n_{y_i}),u_1(t-1),\ldots,u_1(t-n_{u_1}),\ldots,u_r(t-1),\ldots,u_r(t-n_{u_r})),$$

where i=1, . . . m and $Y_i$ is the estimation of the ith output vector, $u_j$, j=1,2 . . . ,r are the input vectors and $n_{y_i}$ and $n_{u_j}$ are not subscript the corresponding orders or "time lags". This model structure effectively decouples the estimate of the ith output from the other output measurements and gives rise to a particularly simple diagnostic scheme.

The equation below shows the second type of structure of a MIMO model. In this kind of structure, the type II model equation, each output estimation $\hat{y}_i$ is affected by the dynamics of all the other outputs and inputs. This structure is quite general and is most often used in system representation but necessitates more complex diagnostic algorithms.

$$\hat{y}_i(t)=f(\hat{y}_1(t-1),\ldots,\hat{y}_1(t-n_{y_1}),\ldots,\hat{y}_i(t-1),\ldots,\hat{y}_i(t-n_{y_i}),\ldots,\hat{y}_m(t-1),\ldots\hat{y}_m(t-n_{y_m}),u_1(t-1),\ldots,u_1(t-n_{u_1}),\ldots,u_r(t-1),\ldots,u_r(t-n_{u_r})),i=1,\ldots,m$$

METHOD V

Neural Network Processing

Figure 8:
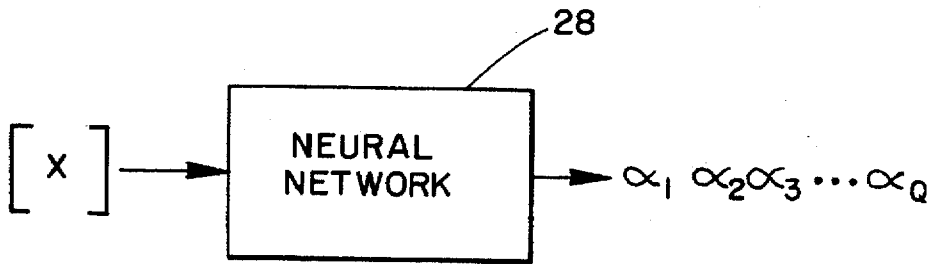
FIG. 8 is a block diagram representation of a combustion classification analysis method according to a fifth preferred embodiment of the instant invention; and, FIG. 9 is a block diagram representation of a combustion classification analysis method according to a sixth preferred embodiment of the instant invention.

FIG. 8 illustrates a fifth preferred embodiment of the present invention. As shown there, a neural network is used to perform a neural network processing 28 for relating an input spark plug voltage waveform signal matrix [X] to a plurality of output parameters $\alpha_2, \ldots, \alpha_Q$. More particularly, the neural network is trained to learn, according to the present invention, the stimulus—response pair ([X], ($\alpha_1$–$\alpha_Q$)). The stimulus—response pair maps an input spark plug voltage waveform signal into a vector of combustion quality measures.

To train the network, a test engine is operated in each of a knocking combustion, a normal combustion, slow burn, partial burn and misfire conditions. In each mode of operation, the network weights are suitably adjusted until the desired output signal is generated. There are many training algorithms available such as backpropagation and others well known in the art.

After the network is trained to recognize the five operating conditions set forth above, the resultant weights are stored in a memory, such as a ROM memory device, for real time on-board combustion analysis in vehicles equipped with engines of the type used to train the network.

METHOD VI: FUZZY CLASSIFIER PROCESSING

Figure 9:
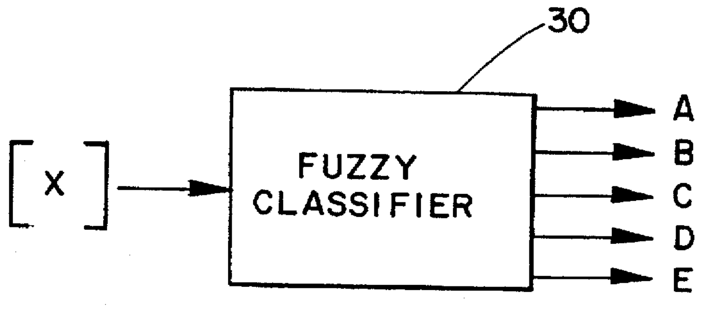

FIG. 9 illustrates a sixth preferred embodiment of the present invention. As shown there, a fuzzy classifier is used to perform fuzzy systems processing method 30 for relating an input spark plug voltage waveform signal matrix [X] to a plurality of output parameters A, B, C, D and E. More particularly, the fuzzy classifier includes sets of fuzzy rules and fuzzy membership functions adjusted to perform a recognition of the input-output pair ([X], (A–E)). The input-output response system maps an input spark plug voltage waveform signal into a vector of combustion quality metrics.

The invention has been described with reference to the preferred embodiment. Obviously, modifications and alterations will occur to others upon a reading an understanding of this specification. It is my intention to include all such modifications and alterations insofar as they come within the scope of the appended claims or the equivalents thereof.

Having thus described the invention, I now claim:

1. A method of combustion analysis in an internal combustion engine comprising:

providing a first set of characteristic parameters relating a plurality of spark plug voltage waveform signals with a plurality of combustion quality measures including operating a first internal combustion engine under a plurality of combustion conditions while sampling a spark plug voltage waveform to obtain at least one of a knocking combustion measure, a normal combustion measure, a slow burn combustion measure, a partial burn combustion measure, and a misfire combustion measure;

sampling a first spark plug voltage waveform signal during a first combustion process in a second internal combustion engine;

generating a second set of characteristic parameters based on said first spark plug voltage waveform signal; and, classifying said first combustion process as one of said plurality of combustion quality measures based on a correlation between said first set of characteristic parameters and said second set of characteristic parameters.

2. The method according to claim 1 wherein:

the step of classifying includes classifying said first combustion process as one of said plurality of combustion quality measures based on a statistical closeness between said first set of characteristic parameters and said second set of characteristic parameters.

3. The method according to claim 1 wherein:

the step of generating said second set of characteristic parameters includes performing at least one of: a principal component analysis on said first spark plug voltage waveform signal, a wavelet transformation analysis on said first spark voltage waveform signal, a linear parametric system identification analysis on said first spark plug voltage signal, a non-linear parametric system identification analysis on said first spark plug voltage waveform signal, a neural network processing analysis on said first spark plug voltage waveform signal, and a fuzzy classification analysis on said first spark plug voltage waveform signal.

4. A method of combustion analysis in an internal combustion engine comprising:

providing a first set of characteristic parameters relating a plurality of spark plug voltage waveform signals with at least one of a knocking combustion measure, a normal combustion measure, a slow burn combustion measure, a partial burn combustion measure, and a misfire combustion measure;

sampling a first spark plug voltage waveform signal during a first combustion process;

generating a second set of characteristic parameters based on said first spark plug voltage waveform signal by performing at least one of: a principal component analysis on said first spark plug voltage waveform signal, a wavelet transformation analysis on said first spark plug voltage waveform signal, a linear parametric system identification analysis on said first spark plug voltage signal, a non-linear parametric system identification analysis on said first spark plug voltage waveform signal, a neural network processing analysis on said first spark plug voltage waveform signal, and a fuzzy classification analysis on said first spark plug voltage waveform signal; and, classifying said first combustion process as one of said combustion quality measures based on a correlation between said first set of characteristic parameters and said second set of characteristic parameters.

5. The method according to claim 4 wherein:

the step of providing said first set of characteristic parameters includes:

deriving N principal components of said plurality of spark plug voltage waveform signals; and, defining an area in an N dimensional observation space, said area corresponding to said combustion measures; and, the step of classifying includes:

deriving N principal components of said first spark plug voltage waveform signal to define a position in said N dimensional observation space; and, identifying said first combustion process as said combustion measure based on said position in said N dimensional observation space with respect to said plurality of areas.

6. The method according to claim 5 wherein:

the step of providing said first set of characteristic parameters includes operating a first internal combustion engine under a plurality of combustion conditions including a plurality of:

a knocking combustion event, a normal combustion event, a slow burn event, a partial burn event and a misfire event while sampling said plurality of spark plug voltage waveform signals; and, the step of sampling said first spark plug voltage waveform signal includes sampling a spark plug voltage waveform signal in a second internal combustion engine.

7. The method according to claim 4 wherein:

the step of providing said first set of characteristic parameters includes decomposing said plurality of spark plug voltage waveform signals into a first plurality of orthogonal basis functions, each of said plurality of orthogonal basis functions having associated wavelet coefficients corresponding to said combustion measure; and, the step of classifying includes:

decomposing said first spark plug voltage waveform signal into a first basis function having a first wavelet coefficient; and, identifying said first combustion process as said combustion measure based upon a correspondence between said first wavelet coefficient and the wavelet coefficients associated with said plurality of orthogonal basis functions.

8. The method according to claim 7 wherein:

the step of providing said first set of characteristic parameters includes operating a first internal combustion engine under a plurality of combustion conditions including a plurality of:

a knocking combustion event, a normal combustion event, a slow burn event, a partial burn event and a misfire event while sampling said plurality of spark plug voltage waveform signals; and, the step of sampling said first spark plug voltage waveform signal includes sampling a spark plug voltage waveform signal in a second internal combustion engine.

9. The method according to claim 4 wherein:

the step of providing said first set of characteristic parameters includes developing a first set of linear coefficients for mapping a white noise signal into said plurality of spark plug voltage waveform signals, the first set of linear filter coefficients assuming a unique state for said combustion measure; and, the step of classifying includes:

developing a second set of linear filter coefficients for mapping a white noise signal into said first spark plug voltage waveform signal; and, identifying said first combustion process as said combustion measure based upon a correspondence between said first set of filter coefficients and said second set of filter coefficients.

10. The method according to claim 9 wherein:

the step of developing said first set of linear filter coefficients includes operating a first internal combustion engine under a plurality of combustion conditions including a plurality of:

a knocking combustion event, a normal combustion event, a slow burn event, a partial burn event and a misfire event while sampling said plurality of spark plug voltage waveform signals; and, the step of sampling said first spark plug voltage waveform signals includes sampling a spark voltage waveform signal in a second internal combustion engine.

11. The method according to claim 4 wherein:

the step of providing said first set of characteristic parameters includes developing a first set of non-linear coefficients for mapping a white noise signal into said plurality of spark plug voltage waveform signals, the first set of non-linear filter coefficients assuming a unique state for said combustion measure; and, the step of classifying includes:

developing a second set of non-linear filter coefficients for mapping a white noise signal into said first plug spark voltage waveform signal; and, identifying said first combustion process as said combustion measure based upon a correspondence between said first set of filter coefficients and said second set of filter coefficients.

12. The method according to claim 11 wherein:

the step of developing said first set of non-linear filter coefficients includes operating a first internal combustion engine under a plurality of combustion conditions including a plurality of:

a knocking combustion event, a normal combustion event, a slow burn event, a partial burn event and a misfire event while sampling said plurality of spark plug voltage waveform signals; and, the step of sampling said first spark plug voltage waveform signals includes sampling a spark plug voltage waveform signal in a second internal combustion engine.

13. A method of combustion analysis in an internal combustion engine comprising:

providing a first set of characteristic parameters relating a plurality of spark plug current waveform signals with a plurality of combustion quality measures including operating a first internal combustion engine under a plurality of combustion conditions to obtain at least one of a knocking combustion measure, a normal combustion measure, a slow burn combustion measure, a partial burn combustion measure, and a misfire combustion measure;

sampling a first spark plug current waveform signal during a first combustion process of a second internal combustion engine;

generating a second set of characteristic parameters based on said first spark plug current waveform signal; and, classifying said first combustion process as one of said combustion quality measures based on a correlation between said first set of characteristic parameters and said second set of characteristic parameters.

14. The method according to claim 13 wherein;

the step of classifying includes classifying said first combustion process as one of said combustion quality measures based on a statistical closeness between said first set of characteristic parameters and said second set of characteristic parameters.

15. A method of combustion analysis in an internal combustion engine comprising:

providing a first set of characteristic parameters relating a plurality of spark plug current waveform signals with a combustion quality measure including operating a first internal combustion engine under a plurality of combustion conditions including a plurality of: a knocking combustion event, a normal combustion event, a slow burn event, a partial burn event and a misfire event while sampling said plurality of spark plug current waveform signals;

sampling a first spark plug current waveform signal during a first combustion process including sampling a spark plug current waveform signal in a second internal combustion engine;

generating a second set of characteristic parameters based on said first spark plug current waveform signal; and classifying said first combustion process as one of said combustion quality measures based on a correlation between said first set of characteristic parameters and said second set of characteristic parameters.

16. A method of combustion analysis in an internal combustion engine comprising:

providing a first set of characteristic parameters relating a plurality of spark plug gap impedance waveform signals with a plurality of combustion quality measures including operating a first internal combustion engine under a plurality of combustion conditions to obtain at least one of a knocking combustion measure, a normal combustion measure, a slow burn combustion measure, a partial burn combustion measure, and a misfire combustion measure;

sampling a first spark plug gap impedance waveform signal during a first combustion process of a second internal combustion engine;

generating a second set of characteristic parameters based on said first spark plug gap impedance waveform signal; and, classifying said first combustion process as one of said combustion quality measures based on a correlation between said first set of characteristic parameters and said second set of characteristic parameters.

17. The method according to claim 16 wherein:

the step of classifying includes classifying said first combustion process as one of said combustion quality measures based on a statistical closeness between said first set of characteristic parameters and said second set of characteristic parameters.

18. A method of combustion analysis in an internal combustion engine comprising:

providing a first set of characteristic parameters relating a plurality of spark plug gap impedance waveform signals with a combustion quality measure including operating a first internal combustion engine under a plurality of combustion conditions including a plurality of: a knocking combustion event, a normal combustion event, a slow burn event, a partial burn event and a misfire event while sampling said plurality of spark plug gap impedance waveform signals;

sampling a first spark plug gap impedance waveform signal during a first combustion process including sampling a spark plug gap impedance waveform signal in a second internal combustion engine;

generating a second set of characteristic parameters based on said first spark plug gap impedance waveform signal; and, classifying said first combustion process as one of said combustion quality measures based on a correlation between said first set of characteristic parameters and said second set of characteristic parameters.

19. A method of combustion analysis in an internal combustion engine comprising:

providing a first set of characteristic parameters relating a plurality of signature spark plug electrical waveform signals with a plurality of different known combustion quality measures for an internal combustion engine of a particular type;

storing said first set of signature characteristic parameters of said particular type of internal combustion engine in a memory of an onboard computer of a vehicle, said vehicle further comprising an internal combustion engine of said particular type;

sampling a real time spark plug electrical waveform signal of said particular type of engine of said vehicle during a real time combustion process;

generating a second set of characteristic parameters based upon said real time spark plug electrical waveform signal; and comparing said first and second sets of characteristic parameters to classify said real time combustion process of said vehicle engine as one of said known combustion quality measures.

20. The method as set forth in claim 19, wherein said known combustion quality measures include at least one of:

a normal combustion measure;

a knocking combustion measure;

a slow burn combustion measure;

a partial burn combustion measure; and, a misfire combustion measure.

21. The method as set forth in claim 19, wherein the step of generating a second set of characteristic parameters based upon said real time spark plug electrical waveform signal includes performing at least one of:

a principal component analysis on said real time spark plug electrical waveform signal;

a wavelet transformation analysis on said real time spark plug electrical waveform signal;

a linear parametric system identification analysis on said real time spark plug electrical waveform signal;

a non-linear parametric system identification analysis on said real time spark plug electrical waveform signal;

a neural network processing analysis on said real time spark plug electrical waveform signal; and, a fuzzy classification analysis on said real time spark plug electrical waveform signal.

* * * * *